United States Patent [19]

Eckert

[11] Patent Number: 5,447,554
[45] Date of Patent: Sep. 5, 1995

[54] GAS COMPRESSION METHOD AND APPARATUS

[76] Inventor: C. Edward Eckert, 260 Lynn Ann Dr., New Kensington, Pa. 15068

[21] Appl. No.: 176,913

[22] Filed: Jan. 3, 1994

[51] Int. Cl.6 .................... B01D 19/00; B01D 47/00
[52] U.S. Cl. .......................................... 95/42; 95/186; 95/192; 95/203; 95/228; 96/181; 96/201; 96/202
[58] Field of Search ............... 95/42, 158, 169, 186, 95/187, 192, 203, 228, 254, 266; 96/181, 201, 202, 218

[56] References Cited

U.S. PATENT DOCUMENTS

| | | | |
|---|---|---|---|
| 1,762,423 | 6/1930 | Scharpenberg | 95/42 X |
| 1,851,163 | 3/1932 | Daugherty | 96/181 X |
| 3,038,285 | 6/1962 | Mavrovic | 95/158 |
| 3,344,584 | 10/1967 | Kehoe et al. | 96/181 X |
| 3,559,375 | 2/1971 | Bidard | 96/181 X |
| 4,093,544 | 6/1978 | Ross | 96/181 X |
| 4,407,665 | 10/1983 | Lasater | 95/266 |
| 4,415,341 | 11/1983 | Echtler | 96/202 X |
| 4,427,420 | 1/1984 | Reid | 95/192 X |
| 4,456,172 | 6/1984 | Roffelsen | 96/181 X |
| 5,314,613 | 5/1994 | Russo | 95/266 X |

*Primary Examiner*—Robert H. Spitzer
*Attorney, Agent, or Firm*—Andrew Alexander

[57] ABSTRACT

A method for pressurizing a gas using a liquid. The method comprises providing a liquid pump; providing a liquid for introducing to the liquid pump; introducing a gas to the liquid prior to the liquid entering the liquid pump; pumping the liquid and the gas through the liquid pump to provide a compressed mixture of the liquid and gas having an increased pressure; thereafter separating the gas from the liquid while both liquid and gas are under pressure; reducing the pressure of the liquid after the separation; and recirculating the liquid back to the liquid pump.

35 Claims, 1 Drawing Sheet

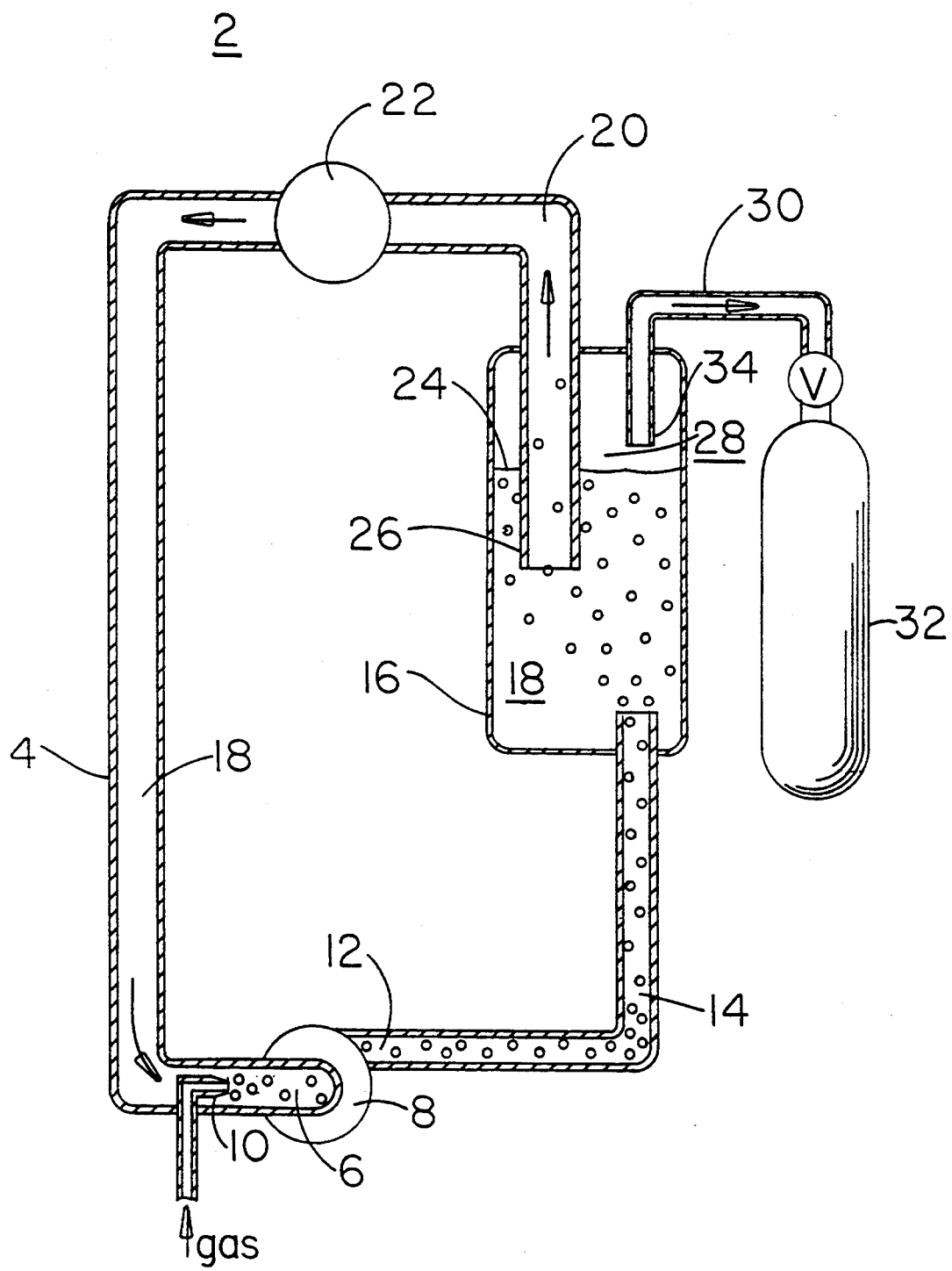

GAS COMPRESSION METHOD AND APPARATUS

Introduction

This invention relates to the compression of gases, and more particularly, this invention relates to the compression of gases using a liquid phase or stream.

To compress gases such as natural gas to pressures of 500 psig or greater requires complex and expensive pumps. Thus, if it is desired to operate a vehicle on natural gas supplied at gas pipeline pressure, the cost to pump the gas to fill the vehicle natural gas tank is prohibitive for a single household. In fact, the high cost to pump the gas is one of the deterrents to operating a vehicle on natural gas.

Thus, there is a great need for an economical system capable of charging gas such as natural gas to a high pressure. The present invention provides such a system.

SUMMARY OF THE INVENTION

It is an object of the present invention to provide a novel system for compressing gas.

It is another object of the present invention to provide a system capable of compressing gas to high pressure levels.

It is yet another object of the present invention to compress gas by compression of a gas dispersed in a liquid.

And yet it is another object of the present invention to compress gas by introducing the gas to a liquid at low pressure and compressing the gas by pressurizing the liquid and then extracting the gas therefrom at high pressure.

Further, it is another object of the present invention to compress a gas by introducing the gas to a liquid, compressing the gas by pressurizing the liquid, removing the gas at high pressure and recirculating the liquid for further gas addition.

These and other objects will become apparent from a reading of the specification and claims and inspection of the drawing attached hereto.

In accordance with these objects, there is provided a method for pressurizing a gas using a liquid. The method comprises providing a liquid pumping means and a liquid for introducing to the liquid pumping means. A gas to be pressurized is introduced to the liquid prior to the liquid entering the liquid pumping means. The liquid pumping means is used to pump the liquid and gas to provide a compressed mixture. Thereafter, the gas is separated from the liquid while both liquid and gas are under pressure. Then, the pressure of the liquid is reduced after the separation and the liquid may be recirculated back to the liquid pumping means.

BRIEF DESCRIPTION OF THE DRAWING

The sole FIGURE is a flow diagram illustrating steps of the invention.

DETAILED DESCRIPTION OF THE PREFERRED EMBODIMENTS

Referring now to the Figure, there is shown an illustration of a system 2 capable of compressing gas to high pressures. The system comprises a low pressure liquid stream 4 which is connected to inlet 6 of liquid pump 8. Gas to be compressed is introduced to low pressure liquid stream 4 through nozzle or venturi 10 to form a dispersion of gas in the liquid. Pump 8 takes the dispersion in through inlet 6 and passes it out through outlet 12 at an elevated pressure to provide a high pressure multi-phase dispersion or liquid gas stream 14.

Stream 14 flows into separator chamber 16. Separator chamber 16 permits the gas phase to separate from gas/liquid stream 18. Gas is collected in the headspace of chamber 16 and is made available for withdrawal as compressed gas at the pressure maintained by chamber 16. In the preferred embodiment as a compressor, the gas should be substantially insoluble in liquid 14.

Liquid in line 20 remains at about the same pressure as liquid in line 14 and separator chamber 16 and is determined by liquid pressure controller 22. This pressure can be preset to a value about equal to the desired compressed gas withdrawal pressure. Liquid pressure controller 22 reduces the pressure energy of the liquid in line 18 to a value suitable for introducing input gas 10 to complete the cycle of compression. Controller 22 can be a fixed orifice, variable area valve, mechanical or electro-mechanical feedback pressure regulator or a hydraulic motor. A hydraulic motor offers the advantage of mechanical energy recovery to pump 8, utilizing suitable belts and pulleys or gears or other methods.

In the process of the invention, liquid is recirculated from the high pressure stream through liquid pressure controller 22 through the low pressure stream 4 to the inlet 6 of pump 8.

The pressure in the high pressure stream can range from 100 to 10,000 psig, depending largely on the pressure to which it is desired to compress the gas. As noted, this level of pressure extends along line 14, through separator 16 and along line 20 to the pressure reducer.

The flow of liquid from separator 16 along line 20 and through pressure reducer 22 is maintained at a rate to permit separation of the gas from liquid in chamber 16. Thus, the liquid 18 in chamber 16 is maintained at a level 24. Line 20, as shown, has an end 26 which serves as a dip tube for removing liquid from chamber 16. It will be appreciated that end 26 should be maintained below level 24 to prevent compressed gas from recirculating.

For purposes of removing compressed gas from separator chamber 16, a gas volume 28 is maintained above level 24. Gas volume 28 will be maintained at the same pressure as the pressure in the high pressure stream. High pressure gas is removed from volume 28 along line 30 to high pressure gas storage chamber 32. Line 30 has an end 34 which dips into high pressure gas volume 8. It will be appreciated that level 24 of liquid 18 should be maintained below end 34 of line 30 in order to avoid ingestion of liquid.

Controls may be provided to maintain the liquid above end 26 of line 20 and below end 34 of line 30.

Because the compression of the gas in the liquid results in heat generation in high pressure stream 14, it is often desirable to provide for cooling of high pressure stream 14 prior to the mixture entering separation chamber 16. The heat referred to is heat due to adiabatic compression of the gas in the liquid. For example, when air at about 70° F. is compressed adiabatically in a single stage from 0 to 3000 psig, the resulting temperature is about 1967° F. Thus, for purposes of the present invention, it is preferred to pass the gas/liquid mixture through a heat exchanger prior to entering separation chamber 16. The temperature in line 14 can be reduced to a temperature in the range of 150° to 750° F. and preferably less than about 500° F. or the heat derived from adiabatic compression in line 14 can be recovered and utilized for steam or electric power generation. The temperature in the low pressure stream can be maintained in the range of 200° to 450° F.

Pressure reducer 22 can be any pressure reducing means that will control the flow of liquid from the high pressure stream to the low pressure stream. Thus, pressure reducer 22 can be a valve that is controlled to maintain the requisite pressure in the high pressure stream. The pressure reducer can be a fixed pipe restriction, and pump 8 responds to the level of pressure in the high pressure stream to maintain the desired level of pressure.

Preferably, pressure reducer 22 comprises a hydraulic pump. Thus, the transition from the high pressure stream to the low pressure stream is made by driving the hydraulic pump. The pump may be utilized to pre-pressurize air or gas feed, e.g., natural gas, fed into the low pressure stream before it is introduced to inlet 6 of pump 8.

Low pressure stream 4 is maintained below the pressure in the high pressure stream. In addition, pressure in the low pressure stream is maintained below the pressure of the gas being introduced into the low pressure stream. Thus, if air is being introduced into low pressure stream 4, preferably stream 4 is maintained at a pressure that is below atmospheric pressure, e.g., 50–100 mm Hg (absolute). Alternatively, air may be prepressurized, as noted, for introducing to low pressure stream 4. In this invention, the pressure of low pressure stream 4 can be higher than atmospheric pressure. For purposes of increasing the efficiency of the compression system, when pressure reducer 22 utilizes a hydraulic pump, the hydraulic pump can be used for purposes of pre-pressurizing gas being introduced to low pressure stream 4, as noted. The pressure in the pressure-reducing step can be reduced to a pressure ratio in the range of 10:1 to 1000:1.

When the compression system is being used for compression of gases, then the liquid used should be not reactive with the gas being compressed, and the gas should not be miscible in the liquid or only to a low level.

While the present system has been described with respect to compressing gases, its use is not necessarily limited thereto. That is, the system may be used for purposes of intimately combining two or more reactants under pressure and temperature for purposes of reacting. Further, a gas may be reacted with a liquid wherein the gas is introduced to the liquid to be reacted and the gas subjected to reaction under pressure and elevated temperature by pumping into the high pressure stream in accordance with the invention.

It will be understood that the present invention has particular application to compress natural gas to high pressures, e.g., 500 to 6000 psig, for use in internal combustion engines.

EXAMPLE

Natural gas is introduced to a conventional diaphram compressor at 0.3 psig, 70° F., and a flowrate of 2 SCFM. This compressor pressurizes the gas to an intermediate pressure of about 60 psig (pressure ratio=5:1). Gas at this intermediate pressure is then introduced to the suction side of a hydraulic pump, co-compressed with silicone fluid (dimethylpolysiloxane) to a discharge pressure of 3700 psig (pressure ratio=50:1), and separated from the fluid in a separation chamber. Compressed natural gas is withdrawn from the separator chamber, dried, and used to fill the appropriate cylinder(s). Silicone fluid, at elevated temperature from the heat of adiabatic compression and friction losses, is passed through an air/liquid heat exchanger operating at a heat rejection rate of approximately 3500 BTU/hr. The fluid is cooled to substantially ambient temperature and passed through a pressure reduction device to reduce the pressure to less than 60 psig. The cycle is then repeated.

Having thus described the invention, what is claimed is:

1. A method for pressurizing a gas using a liquid, the method comprising:
   (a) providing a liquid pumping means;
   (b) providing a liquid for introducing to said liquid pumping means;
   (c) introducing a gas to said liquid prior to said liquid entering said liquid pumping means;
   (d) pumping said liquid and said gas through said liquid pumping means to provide a compressed mixture of said liquid and gas having a higher pressure than the liquid prior to said liquid entering said liquid pumping means; and
   (e) thereafter separating said gas from said liquid while both liquid and gas are under said higher pressure.

2. The method in accordance with claim 1 wherein after pumping the pressure of said mixture is in the range of 100 to 10,000 psig.

3. The method in accordance with claim 1 including cooling said compressed mixture prior to separating said gas from said liquid and after said liquid and gas have passed through said pumping means.

4. The method in accordance with claim 1 wherein said liquid is substantially inert with respect to said gas.

5. The method in accordance with claim 1 wherein said liquid is liquid silicone.

6. The method in accordance with claim 1 including reducing the pressure of said liquid after separating said liquid from said gas, said pressure of said liquid is reduced to a pressure ratio in the range of 10:1 to 1000:1.

7. The method in accordance with claim 1 including reducing the pressure of said liquid after separating said liquid from said gas, said pressure of said liquid is reduced to a pressure of less than one atmosphere.

8. The method in accordance with claim 1 including reducing the pressure of said liquid after separating said liquid from said gas, said pressure of said liquid is reduced to a pressure in the range of 50 to 600 mm Hg (absolute).

9. The method in accordance with claim 1 wherein the temperature of the mixture prior to separation is maintained in the range of 150° to 750° F.

10. The method in accordance with claim 1 including reducing the pressure of said liquid after said separating and recirculating said liquid back to said pumping means.

11. The method in accordance with claim 1 wherein the gas is natural gas.

12. The method in accordance with claim 1 wherein the liquid pumping means is a rotary pump.

13. The method in accordance with claim 1 wherein said gas separated from said liquid is maintained at a pressure in the range of 500 to 6000 psig.

14. A method for pressurizing a gas using a liquid, the method comprising:
   (a) providing a liquid pumping means;

(b) providing a liquid for introducing to said liquid pumping means, said liquid being maintained at a pressure of less than one atmosphere;

(c) introducing a gas to said liquid prior to said liquid entering said liquid pumping means;

(d) pumping said liquid and said gas through said liquid pumping means to provide a liquid and gas mixture having a pressure in the range of 1000 to 6000 psig;

(e) cooling said mixture to a temperature in the range of 150° to 750° F.;

(f) thereafter separating said gas from said liquid to provide a gas having a pressure in the range of 1000 to 6000 psig;

(g) reducing said pressure of said liquid after said separation to less than one atmosphere; and (h) recirculating said liquid back to said liquid pumping means.

15. A liquid recirculating method for pressurizing a gas, the method comprising:

(a) providing a low pressure liquid stream;

(b) providing a high pressure liquid stream;

(c) circulating said liquid from said low pressure liquid stream to said high pressure liquid stream wherein said low pressure stream is connected to means for pressurizing and transfering said liquid to said high pressure stream;

(d) transferring said liquid from said high pressure liquid stream to said low pressure liquid stream through a pressure reducing means;

(e) introducing gas to be pressurized to said low pressure stream to provide a mixture that is compressed in said high pressure stream; and (f) separating pressurized gas from said liquid in said high pressure stream.

16. The method in accordance with claim 15 wherein the pressure in the high pressure stream is in the range of 100 to 10,000 psig.

17. The method in accordance with claim 15 including the step of cooling said compressed mixture in said high pressure stream prior to separating said gas from said liquid.

18. The method in accordance with claim 15 wherein said liquid is substantially inert with respect to said gas.

19. The method in accordance with claim 15 wherein said liquid is liquid silicone.

20. The method in accordance with claim 15 including reducing the pressure of said liquid after separating said liquid from said gas, said pressure of said liquid is reduced to a pressure ratio in the range of 10:1 to 1000:1.

21. The method in accordance with claim 15 including reducing the pressure of said liquid after separating said liquid from said gas, said pressure of said liquid is reduced to a pressure of less than one atmosphere.

22. The method in accordance with claim 15 including reducing the pressure of said liquid after separating said liquid from said gas, said pressure of said liquid is reduced to a pressure in the range of 50 to 600 mm Hg (absolute).

23. The method in accordance with claim 15 wherein the temperature of the mixture prior to separation is maintained in the range of 150° to 750° F.

24. The method in accordance with claim 15 wherein the liquid is maintained at a temperature in the range of 200° to 450° F. after separating from said gas.

25. The method in accordance with claim 15 wherein the gas is natural gas.

26. The method in accordance with claim 15 wherein the means for pressurizing and transferring is a rotary pump.

27. The method in accordance with claim 15 wherein said gas separated from said liquid is maintained at a pressure in the range of 100 to 10,000 psig.

28. A liquid recirculating system for pressurizing gas, the system comprising:

(a) a low pressure liquid stream;

(b) a high pressure liquid stream;

(c) a pump means positioned between said streams for transferring liquid from said low pressure liquid stream to said high pressure liquid stream;

(d) a pressure reducing means for reducing pressure of liquid flowing from said high pressure liquid stream to said low pressure liquid stream;

(e) means for introducing gas to said low pressure stream; and (f) means for separating gas from liquid in said high pressure stream.

29. The recirculating system in accordance with claim 28 including means for cooling said high pressure stream prior to separating gas from said liquid.

30. The recirculating system in accordance with claim 28 wherein said pressure reducing means comprises a pump.

31. The recirculating system in accordance with claim 28 wherein said pressure reducing means comprises a pump utilized to pressurized gas being added to said low pressure stream.

32. The recirculating system in accordance with claim 28 wherein said liquid is liquid silicone.

33. The recirculating system in accordance with claim 28 wherein said pump is a rotary pump.

34. The recirculating system in accordance with claim 28 wherein said pressure reducing means is a nozzle.

35. The recirculating system in accordance with claim 28 wherein said pressure reducing means is a pressure regulating valve.

* * * * *